June 15, 1943.  C. R. CARNEY  2,321,654
ICE TRAY
Filed Dec. 9, 1940
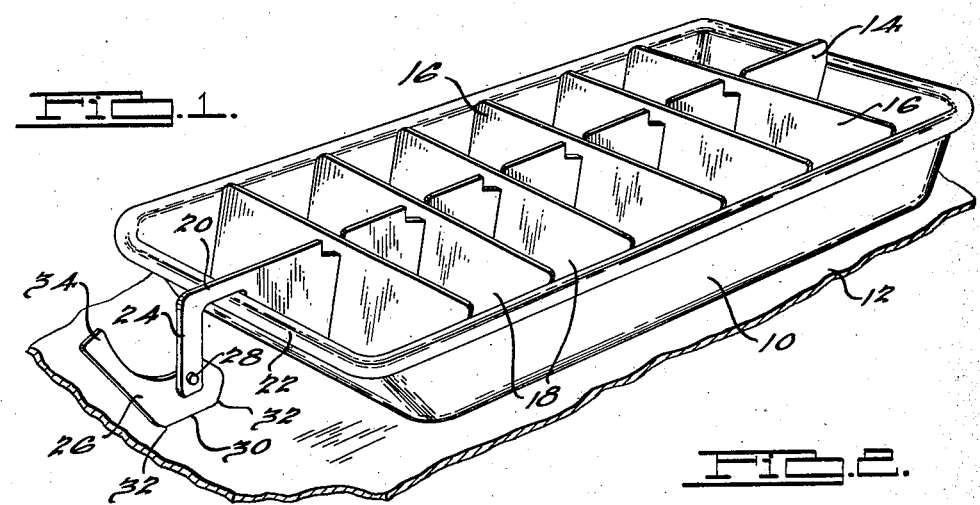
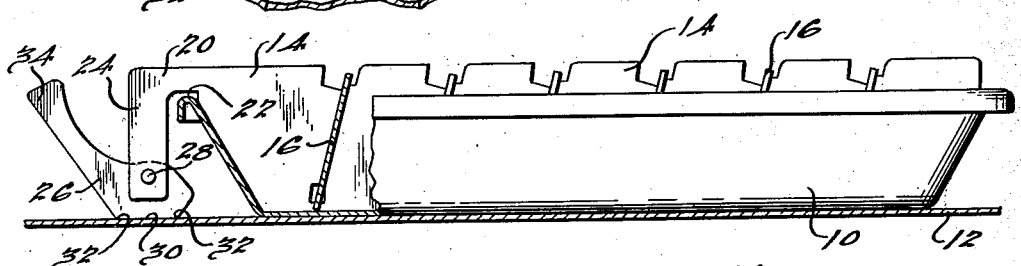
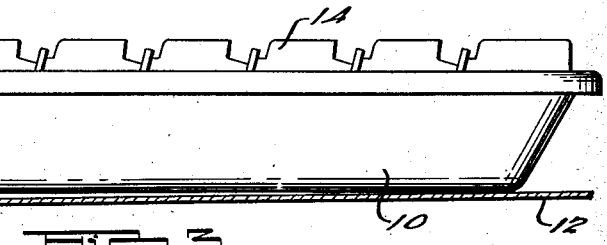
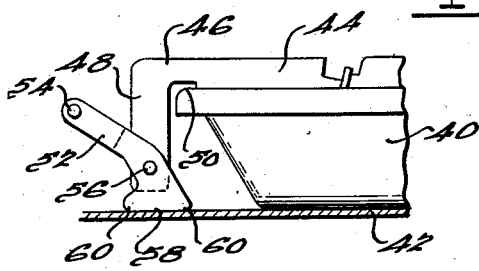  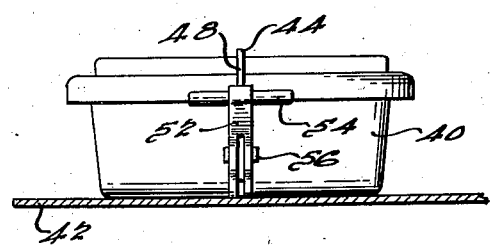
INVENTOR
Clifford R. Carney.
BY
ATTORNEYS.

Patented June 15, 1943

2,321,654

UNITED STATES PATENT OFFICE 2,321,654

ICE TRAY

Clifford R. Carney, Dearborn, Mich., assignor to General Motors Corporation, Detroit, Mich., a corporation of Delaware Application December 9, 1940, Serial No. 369,153

5 Claims. (Cl. 62—108.5)

This invention relates to ice trays and more particularly to means for effecting the release of ice tray pans from refrigerator or evaporator shelves.

Heretofore considerable difficulty has been experienced in releasing the pan from the supporting surface of a refrigerator by reason of the fact that a thin film of moisture accumulates between the bottom of the pan and the top of the supporting surface. When the contents of the pan is subjected to a freezing operation this thin film of moisture solidifies whereupon the bottom of the pan and the top of the supporting surface are frequently firmly bonded in frozen relationship. In many refrigerators the pan fits into a relatively small compartment which renders it impossible to reach the pan to exert force thereon to break the frozen bond holding the pan to the supporting surface.

Many attempts have been made to solve this problem by providing detached tools or levers which could be inserted under an edge of the pan to exert a prying or lifting force to release the pan from the supporting surface or shelf. Other attempts to solve the problem have been directed to the provision of camming mechanism carried by the pan to exert a lifting force between the pan and the refrigerator shelf to release the pan from the supporting surface.

An object of this invention is therefore to provide readily accessible manually operable means which may be readily actuated to exert a force to lift the pan relative to the supporting surface thereby breaking the bond between the pan and the refrigerator shelf.

Another object of this invention resides in the provision of manually operable camming means carried by the grid structure to exert a force to separate the pan and supporting surface.

A further object of the invention resides in the provision of a camming mechanism operably connected to a longitudinal separator member of a grid structure to exert a force to lift the pan from the supporting surface.

Yet another object resides in the provision of simple, inexpensive, manually operable means carried by a longitudinal separator member of a grid structure whereby a force may be exerted through the ice blocks in the pan to lift the pan from the supporting surface thereby releasing the pan member.

Another object of this invention resides in the provision of a handle member carried by a grid structure whereby force may be exerted to separate the pan from the supporting surface and to carry the grid and pan members as an integral unit.

A further object resides in the utilization of the frozen bond between grid and pan members of an ice block forming device to exert a lifting force on the pan member to separate it from a supporting surface.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a perspective view of an ice tray pan and grid structure embodying the present invention.

Fig. 2 is a side elevation, partly in section, of the device illustrated in Fig. 1, the parts being shown in the ice forming or inoperative position.

Fig. 3 is a view similar to Fig. 2 showing the device in the operated position to effect the release of the pan from the supporting surface.

Fig. 4 is a side elevational view, partly in section, showing a modified form of the invention.

Fig. 5 is an end view, partly in section, of the device illustrated in Fig. 4.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the embodiment of the invention illustrated in Figs. 1 to 3, it will be observed that a pan member 10 may rest upon a suitable supporting surface or shelf 12 of an ice forming machine or evaporator. The space within the pan may be divided by any suitable grid structure such for example as the one illustrated wherein a longitudinal separator member 14 cooperates with the plurality of transverse separator members 16 to divide the space within the pan into a plurality of ice block compartments 18 of suitable size for domestic use. It will be understood that any type grid structure may be employed, and this invention is not limited to any particular form thereof.

Any suitable portion of the grid structure, such for example as the longitudinal separator member 14, may be provided with a generally horizontally extending arm 20 positioned to overlie an end wall 22 of the pan member 10. The arm 20 preferably terminates in a downwardly directed arm 24 adapted to receive a manually operable camming member 26 pivotally mounted thereon by any suitable means such for example as a pin 28. The member 26 is provided with a substantially flat surface 30 adapted to overlie or loosely engage the supporting surface or shelf 12. The surface 30 is bounded by curved camming portions 32 and terminates in a handle member 34.

In the operation of this device the ice block compartments 18 within the pan 10 may be filled with water or other liquid which it is desired to freeze, and the pan and grid structure inserted into the freezing compartment or evaporator of an ice forming machine or refrigerator. When the ice is formed and it is desired to remove the pan and grid structure from the evaporator or freezing compartment, the handle member 34 may be moved in either direction thereby rotating the member 26 on the pin 28. One of the camming portions 32 exerts a camming or lifting force through the arm 24 and the arm 20 to urge the grid structure upwardly. This force is transmitted through the ice blocks to lift the pan 10 from the supporting surface 12.

Since the ice blocks in the ice block compartments 18 engage the separator members of the grid and also engage the internal surface of the pan member 10, the force exerted to lift the grid is transmitted to elevate the pan.

The ice blocks in the pan engage the separator members of the grid structure and also engage the internal walls of the pan because when the liquid congeals to form ice it expands and firmly engages all members with which it is in contact. The pan and grid members are thus securely fastened together when the ice is formed.

The frozen bond between the bottom of the pan and the top of the supporting surface is less tenacious than the bond between the ice blocks and the interior of the pan because the area of contact of the bottom wall of the pan with the shelf is less than the area of contact of the ice blocks with the internal surface of the pan.

If desired, the bottom of the pan may be provided with spaced downwardly extending indentations to reduce the area of contact of the bottom of the pan with the supporting surface. It is common practice in modern ice forming trays to apply a smooth water repellent finish to the surface of the grid and tray members to minimize the adhesion of ice to the grid and tray members. I have found that where such water repellent finishes are employed the force required to release the ice blocks from the internal surface of the pan is greater than the force required to release the bottom of the pan from its supporting surface, particularly where means are provided to reduce the area of surface contact between the bottom of the pan and the supporting surface.

Manipulation of the member 26 thus exerts a downwardly directed force on the supporting surface which results in a lifting force on the grid member. This force is, as pointed out above, transmitted through the ice blocks to exert a lifting force on the pan 10, to elevate the front end of the pan 10 as more clearly illustrated in Fig. 3, thereby releasing the pan from the supporting surface.

Figs. 4 and 5 disclose a modified form of the invention wherein a pan 40 is supported on a shelf 42, and a separator member 44 of the grid structure is provided with generally horizontally and downwardly directed arms 46 and 48 respectively to bridge the space between the upper edge 50 of the pan member 40 and the supporting surface or shelf 42. A member 52 having generally transversely extending projections 54 which may be readily grasped is pivotally mounted to the generally downwardly extending arm 48 by the pin 56 to support a substantially flat surface 58 in engagement with or slightly above the upper surface of the shelf 42. The surface 58 terminates in camming portions 60 positioned to engage the upper supporting surface of the shelf 42 when the handle member is actuated.

This motion transmitting mechanism imparts an upward force to the longitudinal separator member 44 of the grid structure which operates through the ice bond of the ice blocks to the grid and pan members to exert an upwardly directed force on the pan member to elevate the forward end of the pan from the shelf to release the pan from the shelf thereby facilitating the removal of the pan from the evaporator or freezing compartment of the refrigerator.

I claim:

1. In a refrigerating device, a supporting shelf, a pan adapted to be supported on the shelf, a metal grid having cooperating longitudinally and transversely extending separator members to divide the space within the pan into a plurality of ice block compartments and wherein the ice blocks bond the grid and pan together and the pan may be bonded to the supporting shelf by the freezing of a film of liquid between the pan and the shelf, a pan release mechanism comprising a substantially inflexible member carried by the longitudinal separator of the grid and positioned to overlie the forward end of the pan, and manually operable camming means spaced from the pan and pivoted to said last named member to engage the shelf and exert a downwardly directed force thereon to exert an upwardly directed force on the grid transmitted through the ice blocks to elevate the forward end of the pan to break the frozen bond between the pan and the shelf.

2. In an ice forming device, a refrigerator shelf, an ice pan adapted to engage the supporting shelf, a metal grid member to divide the space within the pan into a plurality of ice block compartments of convenient size, force transmitting means carried by the forward end of the grid and extending outside of the pan, manually operable camming means pivotally mounted on the force transmitting means and having a substantially flat surface positioned to overlie the shelf and having longitudinally spaced camming portions spaced from the pan and adapted to engage the shelf to be actuated from the forward end of the pan to exert a downwardly directed force on the shelf to elevate the pan and grid members from the shelf.

3. A refrigerating device comprising a shelf member, a pan member adapted to engage the shelf member, a metal grid member including a generally longitudinally extending separator member and a plurality of generally transversely extending separator members to divide the space within the pan into a plurality of ice block compartments of suitable size for domestic use, a portion of the longitudinal separator member extending beyond the forward edge of the pan free of engagement therewith, motion transmitting means pivoted to said forwardly extending portion of the longitudinal separator member and positioned to overlie the shelf whereby said motion transmitting means may be actuated to exert a camming force on the shelf free of engagement with the pan to elevate the grid and pan from said shelf.

4. An ice forming device comprising a supporting surface, a pan adapted to engage the supporting surface, a substantially rigid grid member including a generally longitudinally extending separator member, generally forwardly and downwardly extending interconnected relatively rigid arms carried by the longitudinal separator member to overlie the forward edge of the pan, and motion transmitting means spaced from the pan and pivotally connected to the downwardly extending arm and positioned to overlie a portion of the supporting surface to exert a downwardly directed force on the supporting surface free of contact with the pan to lift the pan from the supporting surface.

5. In an ice tray grid having cooperating longitudinally and transversely extending separator members adapted to fit within a pan to divide the space within the pan into a plurality of ice block compartments, a projection carried by the longitudinal separator member of the grid and adapted to overlie and extend beyond the front edge portion of the pan free of contact therewith, said projection terminating in a portion positioned outside of the pan and directed downwardly towards the bottom of the pan, and manually operable camming means spaced from the pan and pivoted to said portion of the projection which is positioned outside of the pan to release the pan.

CLIFFORD R. CARNEY.